(12) United States Patent
Stephani

(10) Patent No.: US 8,282,115 B2
(45) Date of Patent: Oct. 9, 2012

(54) INDEPENDENT AIR SUSPENSION FOR OFF-ROAD TRAILERS

(75) Inventor: Scott P. Stephani, Green Bay, WI (US)

(73) Assignee: Terrasport, Inc, Green Bay, WI (US)

( * ) Notice: Subject to any disclaimer, the term of this patent is extended or adjusted under 35 U.S.C. 154(b) by 202 days.

(21) Appl. No.: 12/775,854

(22) Filed: May 7, 2010

(65) Prior Publication Data

US 2011/0272907 A1   Nov. 10, 2011

(51) Int. Cl.
*B60G 9/02* (2006.01)
(52) U.S. Cl. ... 280/124.116; 280/124.102; 280/124.109; 280/124.128; 280/124.162; 280/124.166
(58) Field of Classification Search ........... 280/124.116, 280/124.102, 124.109, 124.11, 124.1, 124.128, 280/124.132, 124.153, 124.157, 124.162, 280/124.166
See application file for complete search history.

(56) References Cited

U.S. PATENT DOCUMENTS

| | | | | |
|---|---|---|---|---|
| 3,285,281 | A * | 11/1966 | Pribonic et al. | 137/596 |
| 4,763,923 | A * | 8/1988 | Raidel | 280/86.5 |
| 4,792,148 | A * | 12/1988 | Hintz | 280/149.1 |
| 5,505,481 | A * | 4/1996 | VanDenberg et al. | 280/86.5 |
| 6,471,223 | B1 * | 10/2002 | Richardson | 280/86.5 |
| 7,108,271 | B2 * | 9/2006 | Smith | 280/124.128 |
| 7,543,833 | B2 * | 6/2009 | Lundmark | 280/124.13 |
| 7,717,442 | B2 * | 5/2010 | Chalin | 280/124.116 |
| 7,841,607 | B2 * | 11/2010 | Dodd | 280/124.128 |
| 2005/0253352 | A1 * | 11/2005 | Ziech | 280/124.128 |

* cited by examiner

*Primary Examiner* — Eric Culbreth

(57) ABSTRACT

A suspension system for use on off-road trailers may be an independent air suspension system that may provide ample wheel travel and stability to keep the wheels on the ground through rough and uneven terrain. Conventional suspension systems may lack adequate wheel travel, may bounce too much, or may not be soft enough. The suspension system of the present invention may use an air bag to normalize the suspension for varying weights of the trailer load, allowing proper suspension for both heavy and light loads.

12 Claims, 2 Drawing Sheets

INDEPENDENT AIR SUSPENSION FOR OFF-ROAD TRAILERS

BACKGROUND OF THE INVENTION

The present invention relates to suspension systems and, more particularly, to an independent air suspension for use on off-road trailers.

Trailer suspensions are usually leaf spring or torsion. Neither of these conventional suspension systems have the travel or the stability required to traverse off-road conditions.

As can be seen, there is a need for a suspension system that may provide ample wheel travel and stability to keep the wheels of a trailer on the ground through rough and uneven terrain.

SUMMARY OF THE INVENTION

In one aspect of the present invention, a suspension system comprises a suspension base plate adapted to mount a trailer chassis thereupon; a swing arm having a wheel hub at one end thereof and having an upper and a lower portion at another end thereof; an air spring mounted on the suspension base plate; and a translator connecting the air spring to the upper portion of the swing arm, wherein the translator changes the direction of movement of the upper portion of the swing arm.

In another aspect of the present invention, a suspension system comprises first and second suspension base plates adapted to mount a trailer chassis thereupon; first and second swing arms having a wheel hub at one end thereof and having an upper and a lower portion at another end thereof; first and second air springs mounted on respective first and second suspension base plates; first and second translators connecting respective first and second air springs to the upper portion of respective first and second swing arms, wherein the translator changes the direction of movement of the upper portion of the swing arm; first and second adjustable length joint connecting the upper portions of respective first and second swing arms with respective first and second translators, wherein adjustment of the length of the adjustable length joint adjusts a ride height of the trailer chassis; and a torsion bar connecting the lower portions of the first and second swing arms.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a suspension system for use on off-road trailers. The suspension system may be an independent air suspension system that may provide ample wheel travel and stability to keep the wheels on the ground through rough and uneven terrain. Conventional suspension systems may lack adequate wheel travel, may bounce too much, or may not be soft enough. The suspension system of the present invention may use an air bag to normalize the suspension for varying weights of the trailer load, allowing proper suspension for both heavy and light loads.

Figure 1:
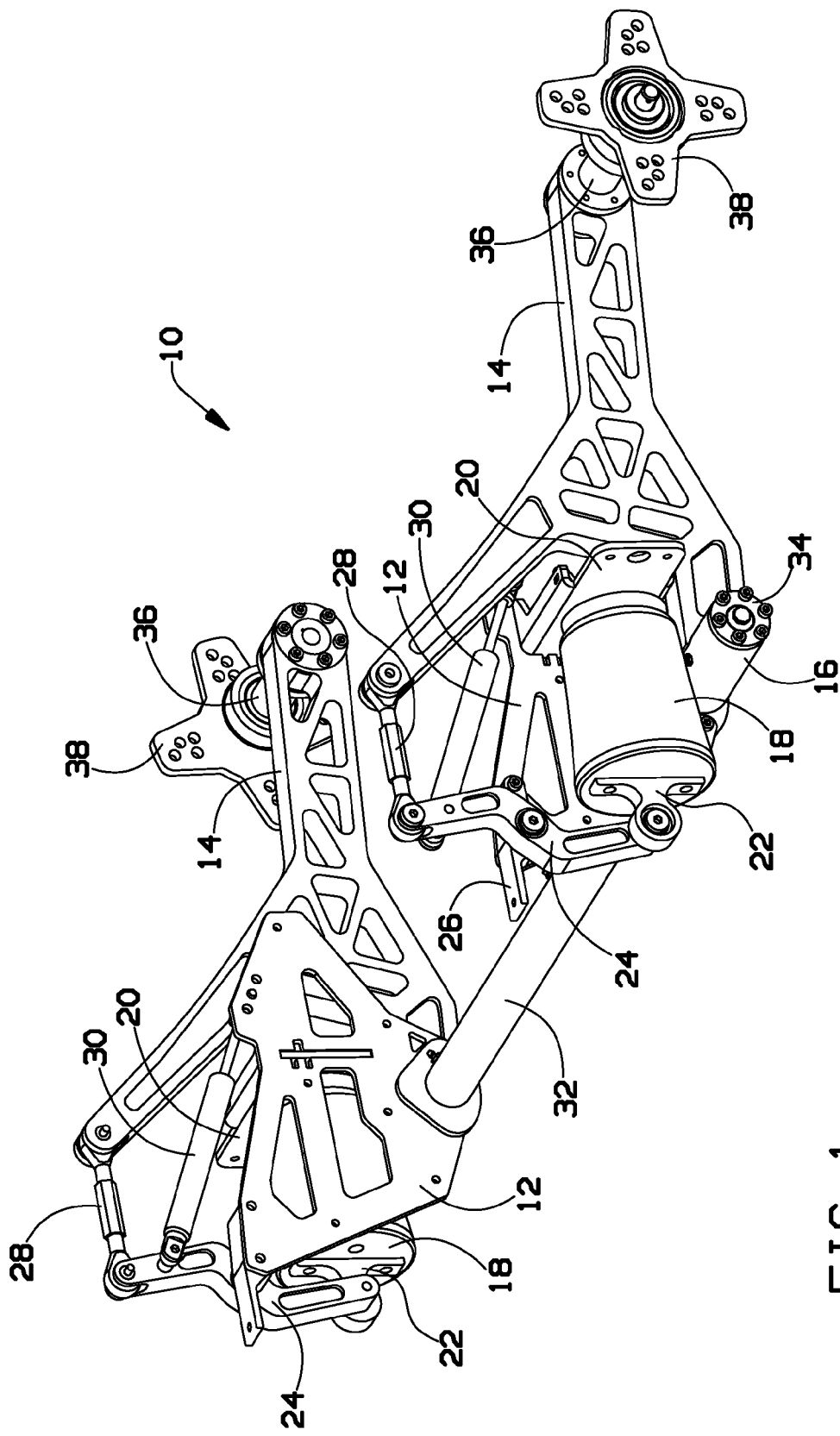
FIG. 1 is a perspective view of a suspension system according to an embodiment of the present invention.
Figure 2:
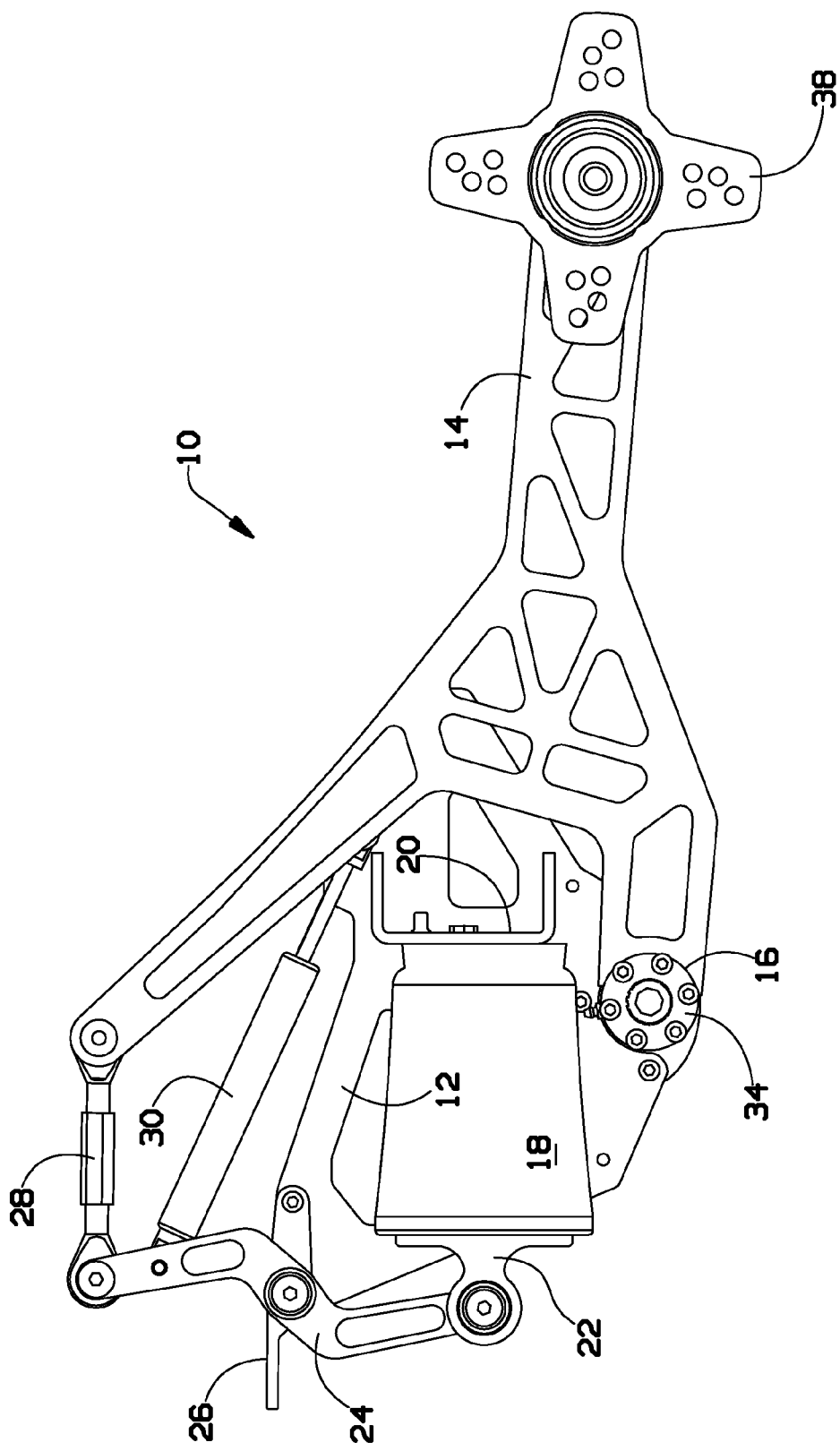
FIG. 2 is a side view of the suspension system of FIG. 1.

Referring to FIGS. 1 and 2, a suspension system 10 may include first and second suspension base plates 12 located at opposing ends of a torsion bar 32. The suspension base plates 12 may attach to a trailer chassis (not shown) at mounts. The suspension base plates 12 may be a laser cut metal plate.

One end of a swing arm 14 may attach to wheels (not shown) of the trailer via a spindle 36 and a wheel hub 38. The other end of the swing arm 14 may branch into an upper portion and a lower portion, as shown in FIG. 1. The lower portion of the swing arm 14 may be pivotably connected to the torsion bar 32 via a swing arm pivot 16. A torsion bar cap 34 may hold the swing arm 14 onto the torsion bar 32. The swing arm pivot 16 may also prevent the swing arm 14 from having any lateral movement. The torsion bar 32 may twist when the swing arm 14 is moved up or down. The torsion bar 32 may minimize side loads upon air springs 18 to increase trailer roll stiffness.

The upper portion of the swing arm 14 may connect to one end of a translator 24 via a Heim joint 28. The Heim joint 28 may provide mechanical articulation to tie together the swing arm 14 and the translator 24. The length of the Heim joint 28 may be altered to adjust the ride height of the trailer. A spacer 26 may be provided between a central portion of the translator 24 and the suspension base plate 12 to maintain the correct distance between these components.

The other end of the translator 24 (opposite the end connecting to the Heim joint 28) may be connected to an air spring 18. One end of the air spring 18 may include an air spring connector 22 for connecting the air spring 18 to the translator 24. The other end of the air spring 18 may include an air spring mount 20 for attaching the air spring in a fixed position to the suspension base plate 12. The air spring 18 may be an air bellows to mechanically absorb the shock of motion using confined air. In one embodiment of the present invention, the air spring 18 may be manually adjusted for optimum pressure to compensate for any load weight placed in the trailer. The body of the trailer may include a viewing port (not shown) to allow a user to view the extent of displacement of the air spring 18. The user may add or remove air from the air spring 18 to optimize the air spring 18 displacement for the current load in the trailer. In one embodiment, this optimized displacement may be a central location along the air spring's displacement range.

A hydraulic damper 30 may join an upper portion of the translator 24 with the suspension base plate 10. The hydraulic damper 30 may dissipate the energy of the suspension by attenuating the vibration of the wheel and of the body. The hydraulic damper 30 may act as a shock absorber to minimize abrupt movement and prevent bounce. The hydraulic damper 30 may be designed to have little or no lengthening resistance and minor compression resistance.

In use, according to an exemplary embodiment of the present invention, the air spring 18 may move about two inches in either direction. The wheel hub 38 may typically have a range of motion of about three inches up and about three inches down.

The translator 24 may change or reverse the direction of movement of the swing arm 14 into the air spring 18. When the wheel hub 38 is moved vertically up (by, for example, driving the trailer over a bump), the translator 24 may push into the air spring 18. The air spring 18 may then push back as it is compressed, returning the suspension 10 back to its slack position. The translator 24 may reduce the effect of rebound created with the air spring is compressed. The translator 24 may have upper and lower portions connected by a central portion. The upper and lower portions may be elongated members arranged substantially parallel to each other. The central portion may form obtuse angles, typically from about 110 to 140 degrees, with the upper and lower portions. The upper, central and lower portions may be integrally formed as a single translator 24.

While the suspension system 10 is shown as a two wheel suspension, other configurations of the suspension system 10 may be contemplated by the present invention. For example, a single wheel suspension system may include a single swing arm 14 and a single suspension base plate 12. In another embodiment, multiple suspension systems 10 may be combined on a single trailer chassis to create, for example, a four wheel suspension system.

It should be understood, of course, that the foregoing relates to exemplary embodiments of the invention and that modifications may be made without departing from the spirit and scope of the invention as set forth in the following claims.

We claim:

1. A suspension system comprising:
    a suspension base plate adapted to mount a trailer chassis thereupon;
    a swing arm having a wheel hub at one end thereof and having an upper and a lower portion at another end thereof;
    an air spring mounted on the suspension base plate;
    a translator connecting the air spring to the upper portion of the swing arm; and
    an adjustable length joint connecting the upper portion of the swing arm with the translator, wherein adjustment of the length of the adjustable length joint adjusts a ride height of the trailer chassis.

2. The suspension system of claim 1, wherein the swing arm changes the direction of movement of the suspension system.

3. The suspension system of claim 1, further comprising a hydraulic damper connecting the suspension base plate with an upper portion of the translator.

4. The suspension system of claim 1, further comprising a torsion bar connecting a first suspension base plate with a second suspension base plate.

5. The suspension system of claim 4, wherein the lower portion of the swing arm attaches to one end of the torsion bar and a lower portion of a second swing arm attaches to another end of the torsion bar.

6. The suspension system of claim 1, wherein the air spring is manually adjustable based on the weight of a load carried by the suspension system.

7. A suspension system comprising:
    first and second suspension base plates adapted to mount a trailer chassis thereupon;
    first and second swing arms having a wheel hub at one end thereof and having an upper and a lower portion at another end thereof;
    first and second air springs mounted on respective first and second suspension base plates;
    first and second translators connecting respective first and second air springs to the upper portion of respective first and second swing arms, wherein the translator changes the direction of movement of the upper portion of the swing arm;
    first and second adjustable length joint connecting the upper portions of respective first and second swing arms with respective first and second translators; and
    a torsion bar connecting the lower portions of the first and second swing arms.

8. The suspension system of claim 7, further comprising a hydraulic damper connecting the suspension base plate with an upper portion of the translator.

9. A suspension system comprising:
    a suspension base plate adapted to mount a trailer chassis thereupon;
    a swing arm having a wheel hub at one end thereof and having an upper and a lower portion at another end thereof;
    an air spring mounted on the suspension base plate;
    a translator connecting the air spring to the upper portion of the swing arm; and
    a hydraulic damper connecting the suspension base plate with an upper portion of the translator.

10. The suspension system of claim 9, further comprising an adjustable length joint connecting the upper portion of the swing arm with the translator, wherein adjustment of the length of the adjustable length joint adjusts a ride height of the trailer chassis.

11. The suspension system of claim 9, further comprising a torsion bar connecting a first suspension base plate with a second suspension base plate.

12. The suspension system of claim 11, wherein the lower portion of the swing arm attaches to one end of the torsion bar and a lower portion of a second swing arm attaches to another end of the torsion bar.

* * * * *